Oct. 26, 1943. J. F. STANDISH ET AL 2,332,675

GRINDING MACHINE

Filed Aug. 15, 1940

INVENTORS
John F. Standish
Lester S. Macdonald
By their attorney
Victor Cobb

Patented Oct. 26, 1943

2,332,675

UNITED STATES PATENT OFFICE 2,332,675

GRINDING MACHINE

John F. Standish, Winthrop, and Lester S. Macdonald, Beverly, Mass., assignors to United Shoe Machinery Corporation, Flemington, N. J., a corporation of New Jersey Application August 15, 1940, Serial No. 352,684

9 Claims. (Cl. 51—100)

This application relates to grinding machines and more particularly to a grinding machine of the type disclosed in Letters Patent of the United States 1,850,098 granted March 22, 1932, on an application of A. B. Fowler. Machines of this type are adapted to be used for grinding the cutting blades of rotary cutters such as are used in heel-trimming operations.

In view of the variety of shapes and sizes of heels employed in the manufacture of shoes, a large number of different types of cutters are employed, the profiles of which may be formed for example as an arc of a circle or as a compound or ogee curve for operating on Louis heels. The machine illustrated in the Fowler patent employs a template for guiding the cutter past the grinding wheel so that the cutter will be ground with the desired profile. In this type of machine a different template must be inserted in the machine for each size and shape of cutter and it is obvious that the number of templates required with the machine may be very high.

Cutters used in heel-trimming machines are usually made in several sizes or widths for each style of cutter. For example, if the cutting edge is formed as the arc of a circle, several blades may be provided having different widths but the same radius of curvature of the cutting edge. One of the objects of this invention is to provide a machine of the type illustrated by the Fowler patent in which the template which controls the movement of the cutter past the grinding wheel is mounted for adjustment in such a manner that the same template may be employed for grinding cutters of different widths having similar profiles.

In accordance with a feature of the invention, the template is mounted for lengthwise movement relative to the carriage by which the cutter is supported so that the position of the template relative to the carriage may be adjusted in accordance with the width of the cutter carried thereby. This adjustment compensates for the shift in the position of the center of curvature of the cutting blades relative to the supporting member as cutters of different widths are placed in the machine. Another adjustment is provided for the template to insure that the correct angular relationship will exist between the template and the carriage as the template is shifted lengthwise relative thereto. Provision is made for readily determining the proper adjustment of the template in the machine for the particular size of cutter to be operated upon. These adjustments of the template, adapting a single template for use with a plurality of different sized cutters reduces the number of templates required to the number of different styles of cutters which are to be ground and eliminates the necessity of introducing a different template for each size of cutter of any one style. These and other objects of the invention will now be described in detail, reference being had to the drawing, in which Fig. 1 is a perspective view of a portion of a grinding machine illustrating one form of mechanism by which the movement of the cutter to be ground is controlled relative to the grinding wheel;

Figure 1:
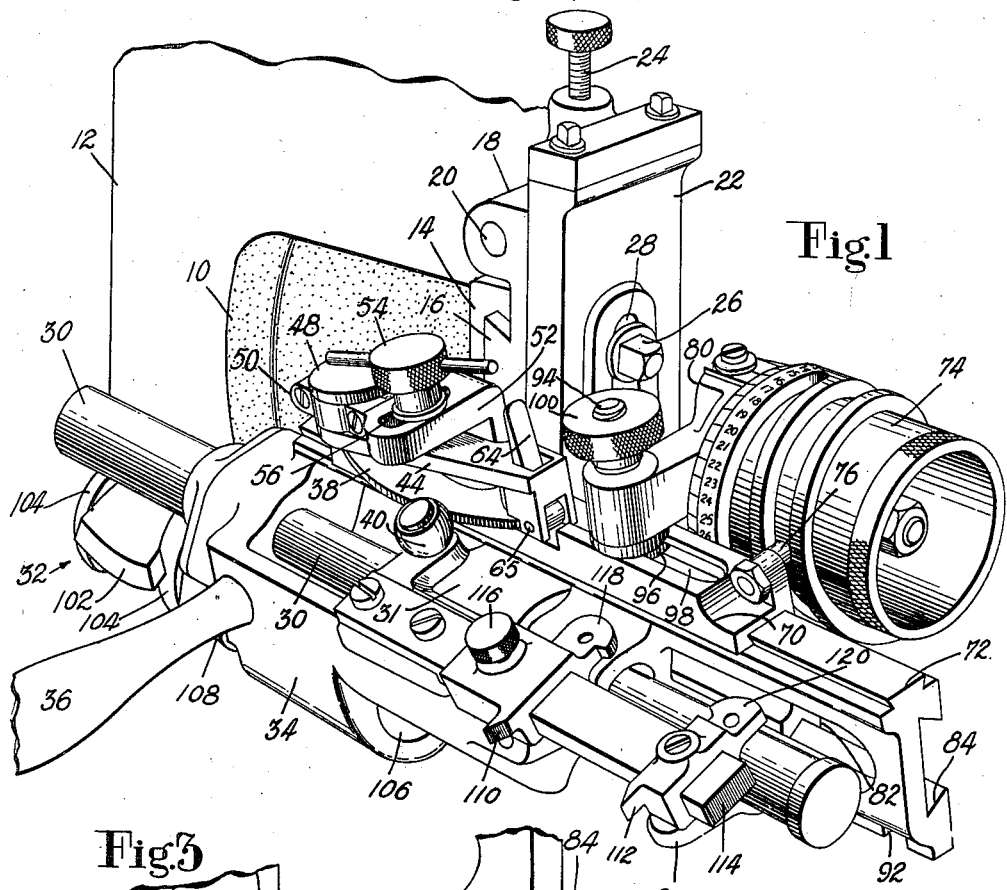

A grinding wheel 10, driven in any suitable manner, is supported in a frame 12 which extends over the top of the grinding wheel and at the right side thereof has a depending portion 14 provided with a horizontally extending dovetail groove for supporting the dovetail portion 16 of a slide member 18. A screw 20 is provided for adjusting the slide 18 horizontally in a direction perpendicular to the axis of the grinding wheel 10, the screw being threaded into the slide and held against axial movement relative to the frame in any suitable manner. Carried by the slide 18 for vertical adjustment is a support 22, the position of the support relative to the slide being determined by a screw 24 the lower end of which is arranged to rest on the upper surface of the slide. A screw 26 threaded into the slide 18 and passing through a slot 28 in the support 22 locks the support to the slide in the desired vertical position. It will thus be seen that the support 22 is vertically adjustable relative to the frame 12 and since it is mounted on the slide 18 it may also be adjusted horizontally with respect to the frame 12 and the grinding wheel 10.

A shaft 30 extending parallel to the axis of the grinding wheel 10 is secured in an arm 31 extending forwardly from the support 22, this shaft forming means by which a cutter head 32 may be supported for movement axially of the grinding wheel 10 as well as for rocking movement toward and away therefrom. The cutter head 32 is rigidly held in a carriage 34 which is journaled on the shaft 30 and arranged to slide relative thereto, the cutter head being mounted in the carriage below the shaft 30. A handle 36 is secured to the carriage 34 and is arranged to be grasped by the operator to impart the desired movements to the carriage relative to the grinding wheel.

Figure 2:
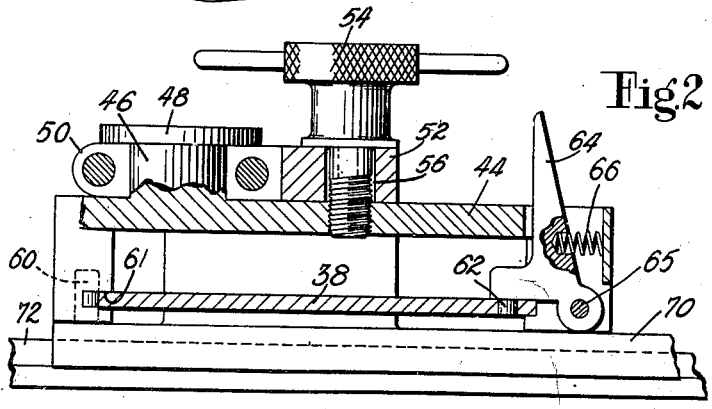
Fig. 2 is a vertical section through the support for the template.

In order to control the rocking movements of the carriage 34 as it is slid along the shaft 30 so that the cutter supported by the carriage will be ground with the desired profile, a template 38 is secured to the carriage and is arranged to engage a roll 40 rotatably mounted on the arm 31. The template 38 is mounted in a template support 44 provided at one end thereof with an upstanding fulcrum pin 46 having a head 48, the fulcrum pin being journaled in a split bearing 50 extending laterally from the horizontal portion of a bracket 52. A screw 54 extends through a slot 56 concentric with the axis of the pin 46 and is threaded into the template support 44 for securing the template support in the desired position of adjustment relative to the bracket 52. The template support 44 carries adjacent to one end thereof a vertically extending pin 60 (Fig. 2) and a recess 61 is formed in the wall of the template support near the bottom thereof for the reception of one end of the template 38 which has a semi-circular recess for embracing the adjacent portion of the pin 60. The other end of the template is apertured to receive a pin 62 mounted on a latch 64 pivoted at 65 in the template support and the latch is biased by a spring 66 to cause the pin 62 to engage the aperture in the template 38 so as to hold the template rigidly in a predetermined position relative to the support 44.

The template support 44 is mounted on the carriage 34 for adjustment lengthwise thereof for a purpose to be hereinafter explained. For this purpose the bracket 52, to which the template support 44 is secured, extends upwardly from a slide 70 having a dovetail groove for engagement with a dovetail portion 72 formed in the upper rearward portion of the carriage 34 and extending parallel to the shaft 30. The slide 70 is arranged to be moved relative to the carriage 34 by a cam 74 provided with a circumferential cam groove within which is received a cam follower 76 mounted on the slide 70. The cam 74 is rotatably mounted in a bracket 80 extending upwardly from a slide 82 received in a slideway 84 formed in the rear vertical wall of the carriage 34. As the cam is rotated, the template supporting slide 70 is moved relative to the slide 82 thus causing movement of the template support lengthwise of the carriage 34 provided the slide 82 by which the cam 74 is supported is rigidly secured to the carriage.

Figure 3:
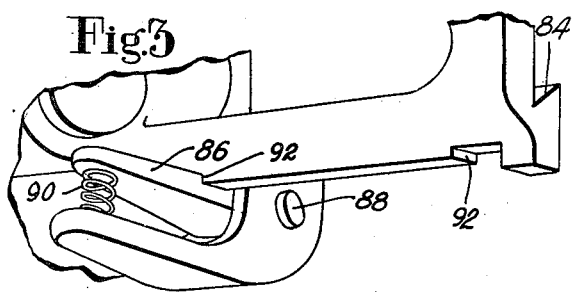
Fig. 3 is a detail view illustrating the means by which the cam support is locked in either of two positions relative to the cutter carriage.

The slide 82 is rigidly secured in the slideway 84 in either of two positions by a latch 86 (Fig. 3) pivoted at 88 to a depending and forwardly extending portion of the slide. A spring 90 acts on the latch 86 to urge the latch upwardly into engagement with the adjacent surface of the slideway which is provided with spaced recesses 92 to receive the latch whereby the slide may be locked in either of two positions. By depressing the latch 86, thus moving it out of engagement with the adjacent recess, the slide 82 is free to move relative to the carriage 34 thus permitting movement of the cam 74, the slide 70 and the template 38 relative to the carriage for a purpose to be described. The slide 70 on which the template is mounted is arranged to be locked to the bracket 80 by a screw 94 having a head 96 underlying a slot 98 in the upper surface of the slide 70 and arranged to be firmly secured to the slide by a nut 100.

The adjustment of the template lengthwise of the carriage 34 is for the purpose of accommodating a single template for grinding the edges of a plurality of similar cutters of varying widths. It is the usual practice to provide a series of cutters of the same type, such as the cutter 102 illustrated in Fig. 1 having the same radius of curvature but different widths, and as long as the radius of curvature of various cutters is the same a single template having the proper profile may be utilized in this machine. The center of curvature of the cutters relative to the carriage 34 varies in accordance with the widths of the cutters inserted in the machine, and therefore, the center of curvature of the template must be correspondingly shifted so that its position relative to the roll 40 will correspond to the center of curvature of the cutter to be ground. As noted in Fig. 1, the cutter 102 is maintained between a pair of clamping collars 104 which are mounted on a shaft 106, the cutter head assembly being secured to the carriage 34 by a nut 108 threaded onto a hollow externally threaded boss (not shown) on the carriage. It will thus be seen that the right-hand clamping collar 104 will always be in the same position relative to the carriage regardless of the width of the cutter held between the clamping collars, and if a cutter head provided with cutters wider than that illustrated but having the same radius of curvature is inserted in the machine, the center of curvature of the cutter will be shifted to the left. The cam 74 by which the position of the template 38 relative to the carriage 34 is shifted is provided with indicia and the bracket 80 supporting the cam has an index line opposite which the indicia on the cam may be placed to determine the proper setting of the cam for the particular cutter which is to be ground. Charts may be made for each set of cutters so that the position of the cam for any cutter of any set may be readily ascertained.

It may also be necessary to adjust the template angularly relative to the support 34 about the axis of the pivot pin 46, particularly when the machine is used for grinding heel trimming cutters, to maintain the symmetrical relationship between the template and the roll 40 and to compensate for any shifting of the center of curvature normal to the cutting edge. This relationship will be upset when the template is shifted relative to the carriage 34 and provision is made for determining the proper angular adjustment of the template relative to the support. Caliper jaws 110 and 112 are mounted on an arm 114 secured to the arm 31, the jaw 110 being adjustable relative to the arm and the jaw 112 being fixed relative thereto. Before inserting the cutter head in the machine, it is presented to the caliper jaws, the position of the jaw 110 being adjusted so that the jaws measure the distance between the clamping collars 104 of the cutter head, the jaw 110 then being secured in position by a screw 116. The caliper jaws are formed at the opposite side of the supporting arm 114 with rounded gage members 118 and 120, and the distance between these members will depend upon the width of the cutter which is to be ground. After the position of the template lengthwise of the carriage 34 has been determined by the adjustment of the cam 74, the angular adjustment of the template is made. With the carriage 34 moved to the right, the latch 86 is pressed down by the operator to permit movement of the slide 82 carrying the bracket 80 which is secured by the screw 94 to the template supporting slide 70. The slide 82 is now moved to the right until the latch 86 engages the recess 92 at the right end of the carriage whereupon the latch 86 is released and snapped into locking position by the spring 90. The screw 54 which locks the template support 44 to the bracket 52 is now loosened and the template is moved about the axis of the pin 46 until the template engages both of the gage members 118 and 120. It will be apparent that some movement of the carriage 34 lengthwise of the shaft 30 may be necessary at this time to enable both of the gage members to be engaged by the template. After the proper angular position of the template relative to the carriage 34 has been obtained, the template support 44 is again locked in place by the screw 54.

After this adjustment of the template has been made, the template will be in the proper position relative to the carriage so that, in cooperation with the roll 40, the proper rocking movement of the carriage 34 about the shaft 30 will be obtained during the sliding movement of the carriage relative to the shaft so that the cutter will be moved past the grinder in the proper path. It should be understood that the type of cutter head illustrated and arranged to be used in a heel-trimming machine is provided with a pair of cutters spaced 180° apart as illustrated more clearly in Letters Patent of the United States 1,753,855 granted April 8, 1930, on an application of A. B. Fowler. The cutter which is to be ground is therefore spaced 180° about the axis of the shaft 106, from the cutter 102 illustrated, and in order to grind the cutter 102 the cutter head is removed from the machine and replaced after being rotated through 180°, suitable provision being made for determining the proper position of the cutter head relative to the carriage 34.

While the cutter illustrated is ground on the arc of a circle, cutters having their cutting edges formed as compound curves, as for example an ogee curve, for operation on Louis heels are formed in sets of different sizes with the central portions of the various cutters of any one set having the same curvature. Accordingly, a suitably shaped template may be employed in the machine for grinding any cutter of a set regardless of the size of the cutter, the same adjustments being made for various widths as is required for the cutter illustrated.

It will be apparent that the adjustments which may be made on this machine will reduce the number of templates required to the number of different types of cutters regardless of the number of sizes of cutters of each type to be ground. This reduction in the number of templates required to be stocked with the machine thus decreases the cost of the equipment while not materially affecting the skill required to operate the machine since the adjustments required are simple and may be quickly made. It will also be apparent that the invention is not restricted to the grinding of cutters used in heel-trimming machines, this type of cutter being shown merely for purposes of illustration.

Having thus described our invention, what we claim as new and desire to secure by Letters Patent of the United States is:

1. In a machine for grinding cutters having curved cutting edges, an abrading element, a cutter carriage mounted for sliding movement in a path parallel to the axis of the abrading element and for oscillating movement toward and away from the abrading element, a template carried by said cutter carriage, a roll arranged to be engaged by said template during the sliding movement of said carriage, means enabling adjustment of the lateral position of one end of said template relative to the other end thereof to vary the angular relationship between the template and said work support, and means engageable with the roll-engaging surface of said template at spaced points for determining and controlling the desired angular relationship between the template and the work support.

2. In a machine for grinding cutters having curved cutting edges, an abrading element, a cutter carriage mounted for sliding movement in a path parallel to the axis of the abrading element and for oscillating movement toward and away from the abrading element, a template carried by said cutter carriage, a roll arranged to be engaged by said template during the sliding movement of said carriage, means for adjusting the template lengthwise of said carriage, calipers carried by said machine and arranged to be spaced in accordance with the width of the cutter carried by the carriage, and means on said calipers arranged to be engaged by said template to determine the proper angular position thereof corresponding to the width of the cutter to be ground.

3. In a machine for grinding cutters having curved cutting edges, an abrading element, a cutter carriage mounted for sliding movement in a path parallel to the axis of the abrading element and for oscillating movement toward and away from the abrading element, a template carried by said cutter carriage, a roll arranged to be engaged by said template during the sliding movement of said carriage, means for adjusting the template lengthwise of said carriage, means for adjusting the angular position of said template relative to said carriage, calipers carried by said machine and arranged to be spaced in accordance with the width of the cutter to be ground, and gages carried by said calipers and arranged to be engaged by said template to determine the proper angular relationship thereof relative to said carriage.

4. In a machine for grinding cutters having curved cutting edges, an abrading element, a cutter carriage mounted for sliding movement in a path parallel to the axis of the abrading element and for oscillating movement toward and away from the abrading element, a template, a support therefor pivoted at one end to said cutter carriage about an axis perpendicular to the template, means locking the other end of the support in a desired position of adjustment relative to said cutter carriage, a pair of calipers arranged to be spaced in accordance with the width of the cutter to be ground, and means carried by said calipers arranged to be engaged by said template to determine the desired position of adjustment thereof.

5. In a machine for grinding cutters having curved cutting edges, an abrading element, a cutter carriage mounted for sliding movement in a path parallel to the axis of the abrading element and for oscillating movement toward and away from the abrading element, a template, a slide mounted on said carriage, means adjustably securing said template to said slide, means carried by the carriage for adjusting the slide thereon, means adjustably locking said slide and said adjusting means as a unit in either one of two positions on said carriage, one of said positions being the grinding position, and means engageable with the template when the slide and the adjusting means are in the other one of said positions to determine the adjusted position of the template relatively to the slide.

6. In a machine for grinding cutters having curved cutting edges, a cutter carriage mounted for sliding movement in a path parallel to the axis of the abrading element and for oscillating movement toward and away from the abrading element, a rotatable cam provided with a cam groove, said cam being mounted on said cutter carriage, a slide carried by said carriage, a template carried by said slide, a roll arranged to be engaged by said template upon sliding movement of said carriage, and a cam follower carried by said slide and arranged to engage the groove in said cam whereby rotative movement of said cam adjusts said slide and said template relative to said carriage.

7. In a machine for grinding cutters having curved cutting edges, a cutter carriage mounted for sliding movement in a path parallel to the axis of the abrading element and for oscillating movement toward and away from the abrading element, a rotatable cam provided with a cam groove, a support for said cam, means for locking said support in either of two positions on said cutter carriage lengthwise thereof, a slide carried by said carriage, said slide having a cam follower engaged by the grove in said cam whereby rotative movement of said cam determines the lengthwise position of said slide relative to said carriage, a template carried by said slide, said template being mounted for angular adjustment relative to said slide, and means cooperating with said template when said cam support is in one of its positions for determining the proper position of said template relative to said slide, and a roll arranged to be engaged by said template when said cam support is in the other of its positions.

8. In a machine for grinding cutters having curved cutting edges, a cutter carriage mounted for sliding movement in a path parallel to the axis of the abrading element and for oscillating movement toward and away from the abrading element, a rotatable cam provided with a cam groove, a support for said cam, means for locking said support in either of two positions on said cutter carriage lengthwise thereof, a slide carried by said carriage, said slide having a cam follower engaged by the groove in said cam whereby rotative movement of said cam determines the lengthwise position of said slide relative to said carriage, a template carried by said slide, said template being mounted for angular adjustment relative to said slide, means cooperating with said template when said cam support is in one of its positions for determining the proper position of said template relative to said slide, said means comprising a pair of abutments arranged to be spaced in accordance with the width of the cutter to be ground and to be engaged by the template when in its proper position of angular adjustment, and a roll arranged to be engaged by said template when said cam support is in the other of its positions.

9. In a machine for grinding cutters having curved cutting edges, a cutter carriage mounted for sliding movement in a path parallel to the axis of the abrading element and for oscillating movement toward and away from the abrading element, a rotatable cam provided with a cam groove, said cam being mounted on said cutter carriage, a slide carried by said carriage, a template carried by said slide, a roll arranged to be engaged by said template upon sliding movement of said carriage, a cam follower carried by said slide and arranged to engage the groove in said cam whereby rotative movement of said cam adjusts said slide and said template relative to said carriage, said cam and its supporting means being provided with cooperating indicia for indicating the proper setting of the slide carrying the template in accordance with the width of the cutter to be ground.

JOHN F. STANDISH.
LESTER S. MACDONALD.